INVENTOR.
WILLIAM L. LINKER
BY
David D. McKenney
ATTORNEY

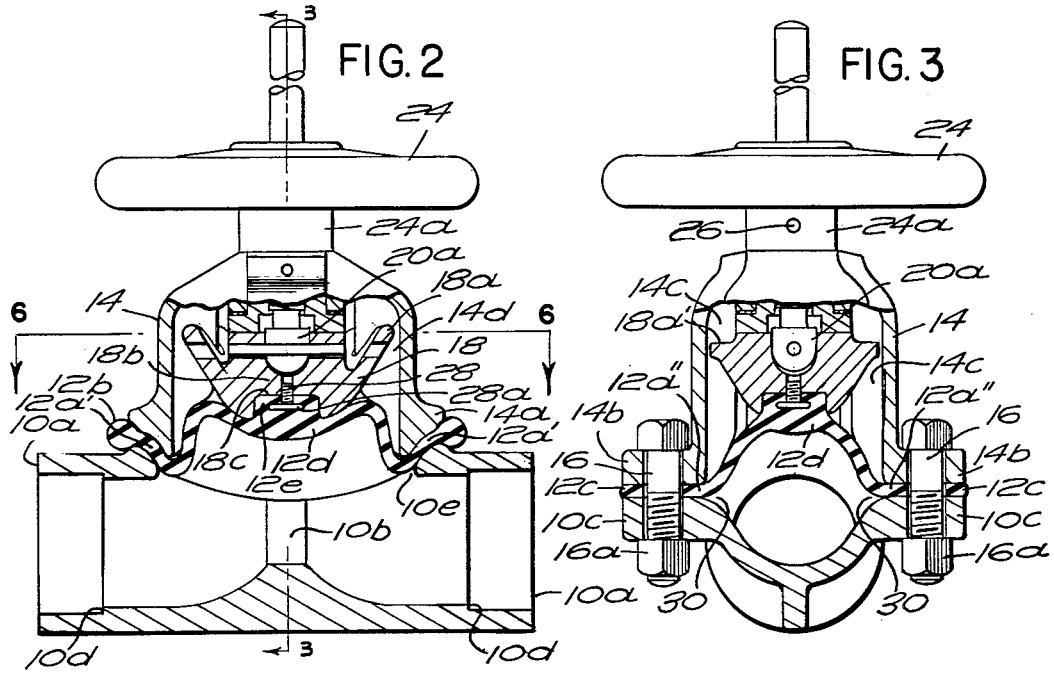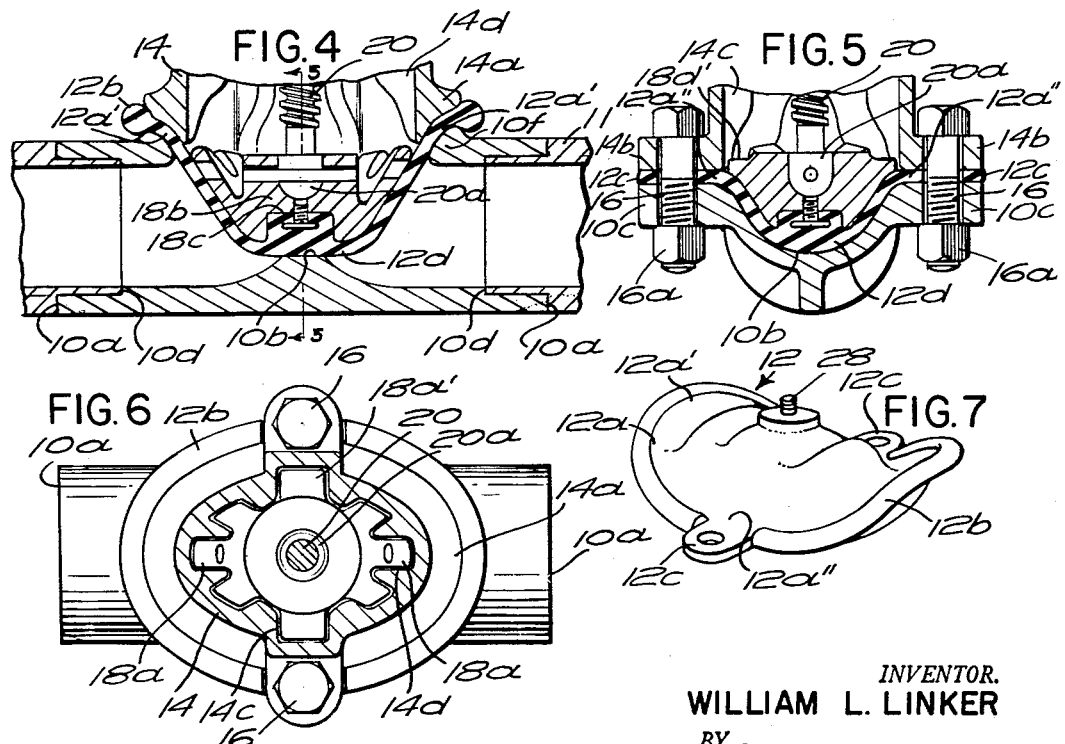

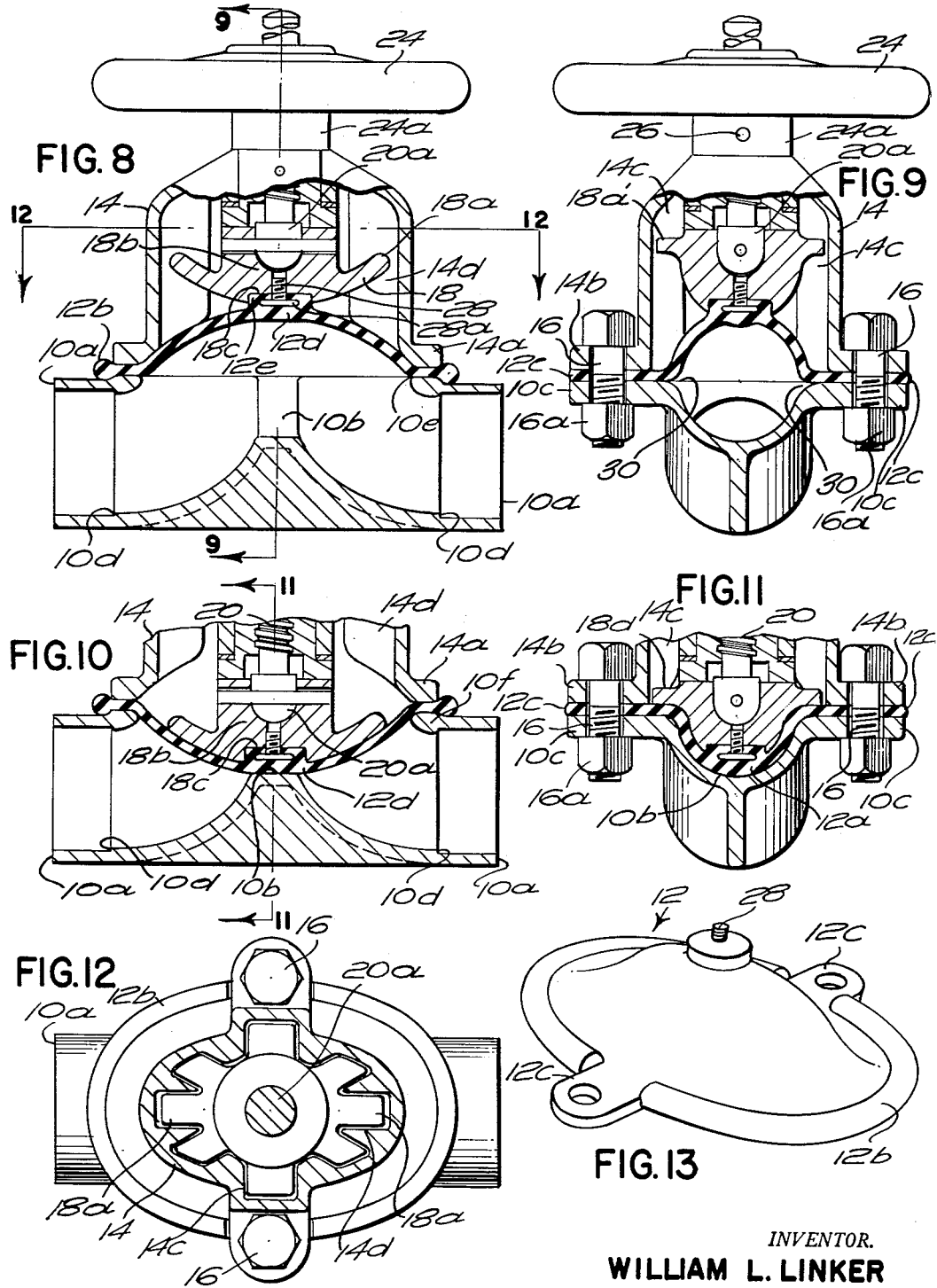

Aug. 23, 1955 W. L. LINKER 2,716,017
DIAPHRAGM VALVES
Filed Aug. 28, 1952 4 Sheets-Sheet 4
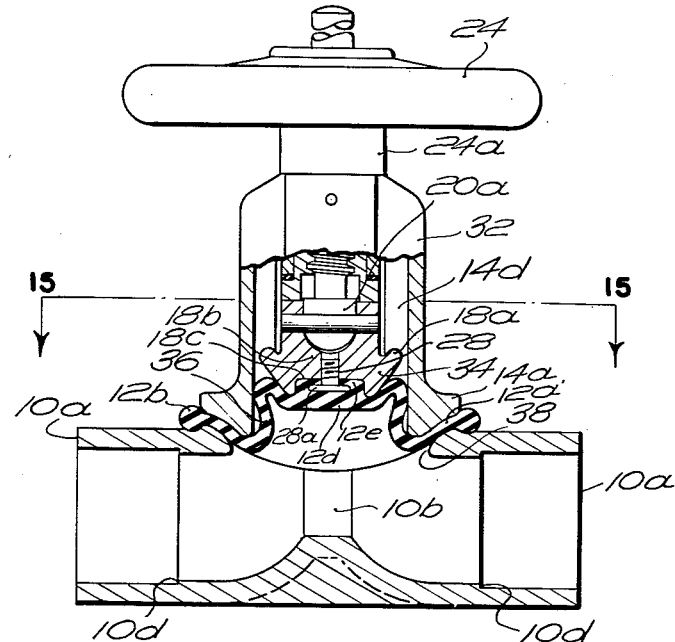
FIG. 14
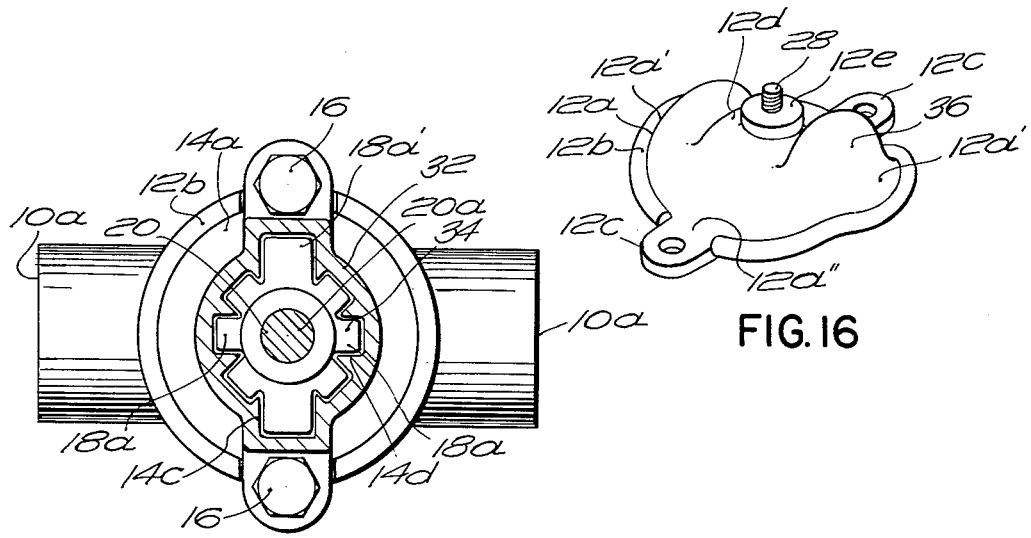
FIG. 15
FIG. 16
*INVENTOR.*
WILLIAM L. LINKER
BY David D. McKenney
ATTORNEY

United States Patent Office 2,716,017
Patented Aug. 23, 1955

2,716,017

DIAPHRAGM VALVES

William L. Linker, Coventry, R. I., assignor to Grinnell Corporation, Providence, R. I., a corporation of Delaware Application August 28, 1952, Serial No. 306,860

10 Claims. (Cl. 251—331)

This invention relates to improvements in diaphragm valves. More especially it has to do with such a valve in which the clamped edge of the diaphragm is saddle-shaped and of oval configuration. These novel diaphragm features permit the use of a very shallow weir without severe flexing of the diaphragm when the latter is moved between its open and closed positions and at the same time without exposure of an unduly large diaphragm area to the line pressure in the valve.

Shallow weirs are desirable in diaphragm valves because when they are used the flow passageways through the valves are substantially unobstructed, thus improving the flow characteristics of the valves and enabling cleaning elements to be passed readily therethrough. Before my present invention, however, the difficulty has been that the employment of shallow weirs has always been accompanied either by severe flexing of a diaphragm having a moderate area exposed to line pressure or by moderate flexing of a diaphragm having an area exposed to line pressure which is unduly large. I disclose hereinafter and in the accompanying drawings novel features of diaphragm valve structure which permit me to gain the several advantages of shallow weirs and simultaneously avoid to a large extent both severe diaphragm flexing and exposure to line pressure of unduly large diaphragm areas.

Diaphragm valves of the general type to which the present invention relates are those in which the body has a passageway therethrough intersected by a transverse weir whose surface extends across the passageway and forms a seat for the diaphragm. The latter is clamped around its periphery between the body and a bonnet mounted thereon which houses most of the actuating mechanism for moving the diaphragm toward and away from the weir. At all times the diaphragm seals off the actuating mechanism in the bonnet from the material flowing through the passageway or standing in the valve body. To close this type of valve the diaphragm is bulged one way and held against the weir by a part of the actuating mechanism called the compressor which has a surface shaped to conform to the concave surface of the diaphragm. To open the valve the diaphragm is bulged the opposite way upon withdrawal of the compressor.

Such diaphragm valves can be employed in any pipe line wherein the temperatures and pressures do not exceed those at which the flexible diaphragm would be materially damaged. They have been used for years in various industries, such as the chemical, synthetic rubber, pulp and paper, food and beverage, textile and mining industries. Because the material in the pipe line is kept separated from the actuating mechanism such valves are especially adapted for use where corrosion, abrasion, contamination, leakage and maintenance are problems.

The liquids, gases and suspended solids handled cannot interfere with the operation of the actuating mechanism nor be contaminated by any lubricant or dirt in the bonnet.

In a diaphragm valve having a high weir the flow characteristics are not all that could be desired because a weir with its seating surface well above the otherwise normal bottom level of the flow passageway prevents direct line flow and causes appreciable eddying within the valve. Furthermore, although the cross sectional area of the flow passageway may not be lessened by the presence of a high weir, it has been customary to materially deform it at the weir from a circular area comparable to that of the pipe line to one of oval-like configuration with its short axis materially less than the inside diameter of the pipe. This deformation of the passageway at the weir prevents use of a ball brush which is large enough to fit snugly in the pipe line and the high weir itself obstructs the use of a rodding tool so that neither element can be employed to clean such a valve.

Heretofore shallow weir valves, and some having no weir at all, have been proposed, but, so far as I am aware, valves of this type have not been deemed entirely successful because the diaphragm employed in each has been of the conventional shape with every point on its clamped peripheral rim lying in a plane. In such a conventional diaphragm, unless the area of it which is exposed to the line pressure is made unduly large in comparison with the pipe line diameter, its movement between the open and closed positions causes such severe flexing of the diaphragm that the material thereof has failed to stand up under repeated openings and closings of the valve.

It is among the objects of the present improvements to provide a diaphragm valve with desirable flow characteristics by having a weir so shallow that the center line of the flow passageway at the weir is only slightly offset from the axis of the pipe line in which the valve is installed. It is a further object to have the flow passageway of such size and so disposed that a rodding element can be pushed or pulled through the valve and a ball brush cleaning element can be blown therethrough. Coupled with the above mentioned objects, it is a further object to provide a diaphragm having its clamped edge of saddle-like shape so that its unclamped center portion can be moved without undue flexing into firm contact with a shallow weir for tight closing and be withdrawn therefrom, also without undue flexing, to provide the desired size of passageway. It is still another object to provide a diaphragm which has an oval or elliptical configuration as viewed along the axis of the bonnet, with the long axis of the oval or ellipse parallel to the axis of the flow line. Other objects are to inwardly incline toward the bottom of the valve the greater portion of the clamping surfaces of the body and bonnet between which the diaphragm is held and to provide an enlarged bead at the edge of the diaphragm just beyond where the latter is engaged by these inclined clamping surfaces.

The best mode in which it has been contemplated applying the principles of the present improvements is shown in the accompanying drawings but these are to be taken as merely illustrative because it is intended that the patent shall cover by suitable expression in the appended claims whatever features of patentable novelty exist in the invention disclosed.

In the appended drawings:

Fig. 2 is a sectional elevation view of the valve of Fig. 1, showing the diaphragm in open position;

Fig. 3 is a similar vertical section taken as on line 3—3 of Fig. 2;

Fig. 4 is another partial vertical section like Fig. 2, but showing the diaphragm in closed position;

Fig. 5 is a similar vertical section taken on line 5—5 of Fig. 4;

Fig. 6 is a plan view in section as on line 6—6 of Fig. 2;

Fig. 7 is a perspective view of the diaphragm;

Figure 8 is a view similar to Figure 2 but showing a diaphragm valve and diaphragm therefor embodying the oval configuration feature without the saddle-like shape feature;

Figures 9 to 13 are other views of the valve and diaphragm of Figure 8 corresponding to Figures 2 to 7;

Figure 14 is a view similar to Figure 2 but showing the form of the invention wherein the bonnet, compressor, diaphragm and opening opposite the weir all are of circular shape when viewed along the axis of the stem;

Figure 15 is a horizontal cross-sectional view taken substantially along the plane of line 15—15 in Figure 14; and Figure 16 is a perspective view of the diaphragm per se of Figure 14.

Figure 1:
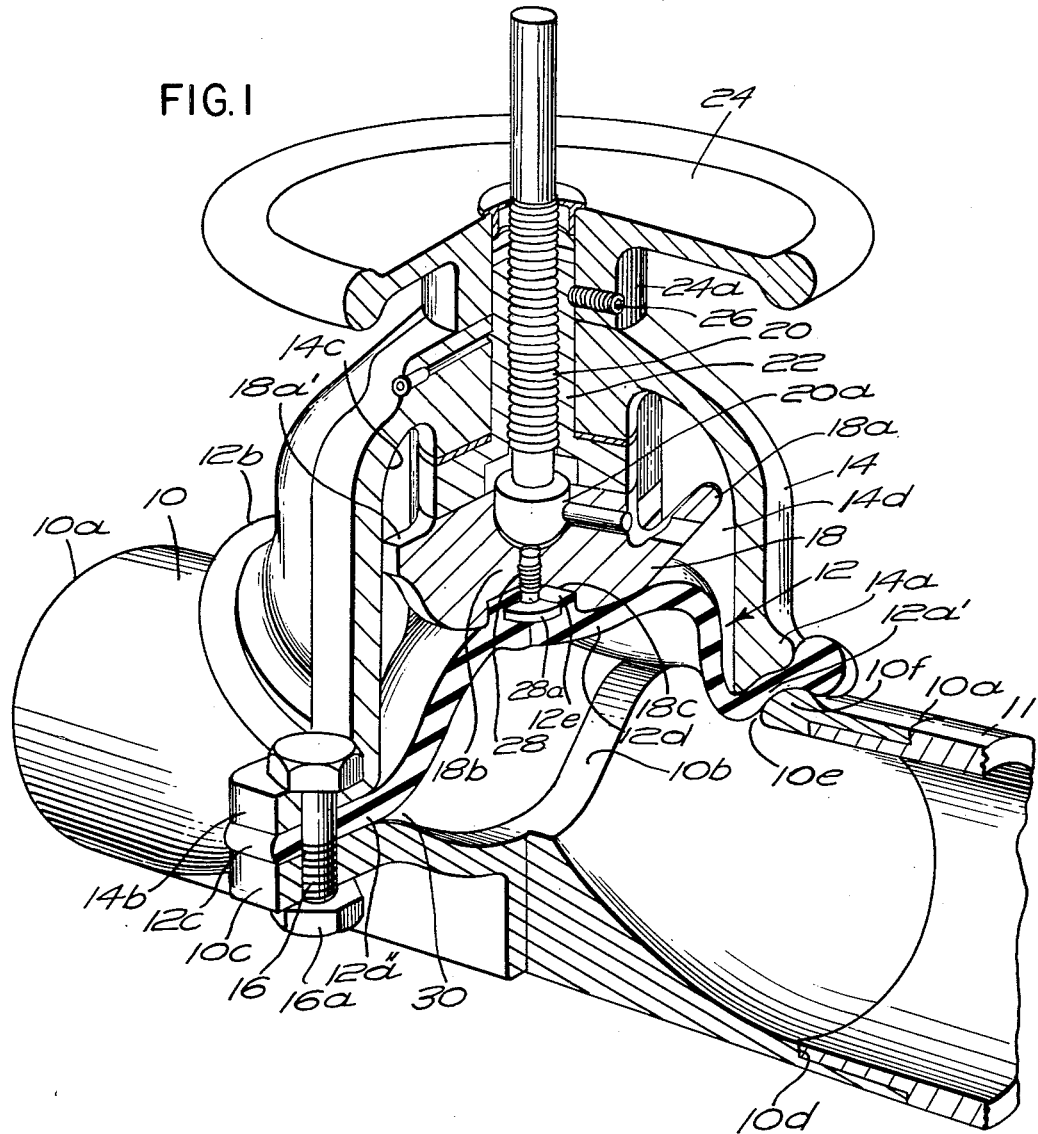
Fig. 1 is a perspective, partly in section, of a diaphragm valve embodying the present improvements, the valve being shown connected to a pipe.

Referring now more particularly to the drawings the improved diaphragm valve has a body 10 here shown with socket ends 10a for connections with a pipe line 11 in which the valve may be installed. Between these ends is a flow passageway having across its bottom a shallow weir 10b which merges into the side walls of the body where projecting portions 10c thereof extend outwardly. From the shoulders 10d of the socket ends the lower half wall of the passageway is streamlined to the edges of the weir. Opposite the weir the body has an opening 10e across which is disposed a flexible diaphragm 12 having its edge 12a clamped between the substantially curved flange 14a on the lower end of a dome-shaped bonnet 14 and a correspondingly curved flange 10f surrounding the opening 10e. The bonnet 14 also has side projections 14b which register with the side projections 10c on the body, and these body and bonnet projections are drawn together by bolts 16 and nuts 16a to provide the clamping force. On the diaphragm 12 beyond its clamped edge 12a is an enlarged bead 12b, and extending between each pair of the above mentioned bonnet and body projections is a diaphragm ear 12c having a hole therein to accommodate the bolt 16.

Within the bonnet 14 above the diaphragm is housed part of the mechanism for moving the diaphragm toward and from its seating surface on the weir 10b. This mechanism comprises a so-called compressor 18 secured to the center of the diaphragm and pinned to the lower end 20a of an externally threaded spindle 20 which extends upward through an internally threaded spindle bushing 22. Both the bushing and the spindle therein project through the top of the bonnet. The actuating mechanism further comprises a handwheel 24 whose hub 24a bears on the upper edge of the bonnet and is secured to the bushing 22 by a screw 26. Rotation of this handwheel causes rotation of the spindle bushing, and the latter's rotary movement is translated by the engaging bushing and spindle threads into vertical travel of the spindle, thereby flexing the diaphragm toward or from the weir depending on the direction of handwheel rotation.

The bottom surface of the compressor 18 is shaped to conform to the contour of the upper side of the diaphragm 12 when the latter is pressed against the weir. The compressor may be continuous, but I prefer that it comprise spaced fingers 18a as shown in the drawings. If the compressor has such spaced fingers two of these 18a' which extend parallel to the weir from either side of the compressor's central portion 18b are longer than those fingers adjacent to them and have their ends engaged loosely in vertical grooves 14c formed in the side of the bonnet to prevent the compressor from rotating.

The purpose in having these spaced fingers rather than a continuous compressor is to permit the use of a so-called finger plate which is normally clamped between the bonnet flange 14a and the diaphragm edge 12a, or to permit the use of fingers 14d which are formed integrally with the bonnet and perform the same function as such a finger plate. In the drawings I show the latter arrangement. These bonnet fingers 14d fit between the compressor fingers 18a and have their under sides shaped to conform to the contours of the upper side of the diaphragm when the valve is open. In this manner the diaphragm is substantially backed up when in its open position and subjected to the force of the line pressure.

The diaphragm 12 may have its bulged center portion 12d molded in either its closed or open position, but preferably the latter because it will then tend to return to its molded form, and this tendency will assist the compressor in lifting the diaphragm away from the weir. At the center of its upper surface the diaphragm has a thickened hub 12e which fits into a recess 18c in compressor and in which is embedded the platelike head 28a of a stud 28 which in turn screws into the compressor.

In each of the valves heretofore proposed which has had a shallow weir or no weir at all a diaphragm of circular configuration with its clamped edge in one place has been used, and, so far as I am aware, this edge has always been clamped between two flat surfaces located at the level of the top side of the flow passageway. This has made it necessary, in closing such a valve, to flex the diaphragm's center portion downward from this top level until it seats on the weir, and similarly, in opening such a valve, it has been necessary to flex this center portion from the weir to a position near the top level of the passageway. Obviously such severe flexing is not conducive to a desired longevity of the diaphragm, and because of this such proposed shallow weir valves have not been widely adopted.

To avoid this shortcoming and to obtain certain advantages the present improved valve employs a diaphragm which is novel in several respects. First of all the diaphragm edge 12a is so shaped that opposed portions 12a' thereof are located slightly above the normal flow passageway of the pipe line, and opposed intermediate edge portions 12a'' which are at the ends of the weir are located between the top and bottom of that passageway. From each side of its opposed elevated portions 12a' the diaphragm edge 12a curves smoothly downward to its opposed lower portions 12a'', giving the diaphragm edge a saddle-like shape. The contours of both the bonnet and flange 14a and the flange 10f surrounding the body opening 10e are curved to conform to this saddle-like shape, as previously indicated, and tightly clamp the diaphragm edge between them when the valve is assembled.

In addition to the above described feature I prefer to use a diaphragm in my improved valve which has an oval or elliptical configuration when viewed along the axis of the valve spindle 20. The longer dimension of this oval diaphragm is parallel to the longitudinal axis of the valve.

When reference is made herein to "diaphragm configuration," as above, what is meant is the configuration of the diaphragm's unclamped center portion which is exposed to line pressure. Beyond this portion the clamped edge may extend to give any overall diaphragm shape desired, but, as will be understood presently when I describe the advantage of using an oval diaphragm, only the configuration as I have defined it affects the amount of diaphragm flexing.

The advantage in using a diaphragm with a saddle-like shaped edge and an oval configuration is that it enables me to provide in such a diaphragm a central bulge 12d whose sides are everywhere less steep than the sides of the bulge in each comparable diaphragm of circular configuration which has been heretofore proposed and which has had its clamped edge in one plane. As a consequence, my improved diaphragm is flexed less abruptly than each of these proposed comparable diaphragms that has come to my attention, because it will be immediately apparent that the steepness of the sides of the bulge determines the amount of flexing to which the diaphragm material is subjected as the valve is opened and closed.

To understand why the sides of the bulge in my diaphragm are not as steep as those in a comparable conventional diaphragm, consider first the saddle-like shaped edge feature. It will be noted from the drawings that when my improved valve is closed the central bulge pressed against the weir does not extend as far below the diaphragm's opposed lower edge portions 12a″ as it would if these edge portions were located at the top level of the flow passageway. Where the diaphragm is circular instead of oval in configuration the sides of its bulge which seat against the weir are considerably less steep than the corresponding sides in a circular diaphragm of the same diameter but having its entire edge clamped at the top level of the passageway. As a result in such a modified form of my preferred diaphragm the flexing in that portion thereof which would seat on the weir would be less severe than the flexing in the corresponding portion of each comparable circular diaphragm heretofore proposed.

A circular diaphragm with a saddle-like shaped edge, as above described is shown in the drawings, Figures 14, 15, and 16, and is within the scope of the present invention because of the flexing advantage which can be obtained in the sides of the bulge thereof which lie against the weir. I prefer, however, to combine with the saddle-like shaped edge an oval diaphragm configuration, and thereby obtain a more modest improvement in flexing condition which, however, is not limited to the particular sides of the bulge that lie against the weir, but exists at all points, as will be understood.

Looking now at Figures 14, 15, and 16, it will be seen that I have provided a diaphragm valve similar to the valve shown in Figures 1–7 with the exception that the bonnet 32, compressor 34, diaphragm 36, and opening 38 are all circularly-shaped, rather than oval-shaped when viewed along the axis of the stem. It is to be noted, however, that in addition to being circularly-shaped, the opening 38 is saddle-shaped, that is, the sides of the opening 38 which are at the ends of the weir are in a lower plane than the ends of the opening. Since like numerals apply to like parts in the other figures, a more detailed description is deemed unnecessary.

Turning now to the oval configuration feature, the opposed higher edge portions 12a′ in the improved diaphragm I show must be located, as must the corresponding edge portions in any diaphragm valve, at the top level of the passageway so as not to interfere with the flow therethrough. Hence, in order to make the slope of the sides of the bulge which lies between these higher edge portions as shallow as possible I have departed from the conventional circular diaphragm configuration by locating these higher edge portions slightly farther apart than the corresponding edge portions of a comparable circular diaphragm. Then to offset the increase in diaphragm area which is caused by thus locating these higher edge portions, and which is undesirable because it makes closing the valve against line pressure more difficult, I also locate my lower diaphragm edge portions 12a″ close enough together to cancel this aforesaid area increase. The result is an oval diaphragm as shown. However, despite the location of the lower edge portion 12a″ in this manner, whereby the diaphragm area is kept the same as the area of a comparable circular diaphragm with its entire edge clamped at the top level of the passageway, the sides of the central bulge between these lower edge portions in my improved diaphragm are still substantially less steep than corresponding sides of such a comparable diaphragm.

As a matter of fact, by proper selection of diaphragm proportions I am able to make the sides of the central bulge between the lower edge portions 12a″ have substantially the same degree of steepness as the sides thereof between the higher edge portions 12a′, with the diaphragm in its closed position, as in Figures 4 and 5, and because the diaphragm edge is curved smoothly between these different edge portions the sides of the bulge are of substantially uniform steepness throughout. The degree of this uniform steepness being less than that of a comparable circular diaphragm with its edge in one plane, my improved diaphragm is flexed less abruptly at every point.

Should there be some doubt from the foregoing as to what is intended by the references to "comparable diaphragms," I mean diaphragms used in heretofore proposed valves which have the same flow passageway diameter at their ends as my improved valve and which have weirs that extend the same distance above the bottom level of the passageway. Naturally comparison of diaphragm areas and comparison of the steepness of the sides of diaphragm bulges cannot be made between valves of different sizes to illustrate advantages resulting from my novel structure. What I have shown with these general comparisons is that my novel diaphragm with its saddle-like shaped edge and oval configuration represents a substantial improvement in diaphragm valves because diaphragm failures, caused by severe flexing of the diaphragm material, are reduced, and I have further shown that this advantage is realized without sacrificing other desirable features such as low weirs and small diaphragm areas.

An additional advantage of the oval diaphragm, insofar as the oval configuration results from locating the opposed lower edge portions 12a″ as close together as is consistent with other objectives, is that the pockets 30 which appear at the ends of the weir when the valve is open are reduced in size. These pockets which are always present to some degree in diaphragm valves are objectionable because they collect foreign matter which is difficult to remove without disassembling the valve. In the preferred form of my improved valve as shown and described these pockets 30 are small and any foreign matter collected in them is more effectively reached by less thorough cleaning methods, as for instance the forcing of a ball brush through the line under pressure or rodding out.

Finally the use of a diaphragm of oval configuration permits a reduction in the overall valve dimensions as measured along the weir.

A diaphragm valve with a diaphragm having an oval configuration and its entire edge clamped at the top level of the flow passageway is also within the scope of my invention when the longer diaphragm dimension is parallel to the axis of the valve body. One advantage obtained by using such a diaphragm is that the sides of the bulge which lie between those diaphragm edge portions located above the center of the passageway will be considerably less steep than the corresponding sides in a circular diaphragm having the same area. It is likewise true that the sides of the bulge which lie against the weir will be somewhat steeper in such a diaphragm than the corresponding sides of a circular diaphragm having the same area, but the increased flexing in these sides may be tolerated in some applications in view of the reduction in the size of the pockets which accompanies it.

Figs. 8 to 13 show a valve of the kind above referred to, namely a valve in which the diaphragm has an oval configuration and has its entire edge portion clamped in a plane at the top level of the flow passageway. Since the structure in this embodiment is generally similar to the structure in the other drawings the same designating numerals are employed.

Since the approach to the seating surface of the weir in every diaphragm valve is preferably a gradual slope in order that the change of direction of flow over the weir be as gradual as possible, it will be apparent that my oval configuration is advantageous in that it permits the use of such a preferred gradual approach without at the same time restricting the passageway as seen in Fig. 8. This is because the diaphragm edge portions which lie above the center of the flow passageway are located, in my diaphragm of oval configuration, a considerable distance from the center of the diaphragm, and consequently the sloped weir approach may be initiated at a maximum distance from the weir itself without reducing the distance between this sloped approach and the top side of the flow passageway to less than the diameter at the ends of the valve passageway. This advantage is of particular importance where it is desired that the valve be cleanable by a ball brush or similar cleaning element, and accordingly where the flow passageway must be of substantially uniform cross section. With a diaphragm of oval configuration, as described, such uniformity of flow passageway cross section is not achieved at the expense of a gradual weir approach.

As has been described the bonnet 14 is fastened to the body 10 by bolts 16 passing through bonnet projections 14b, diaphragm ears 12c and body projections 10c and having nuts 16a threaded thereon. Any suitable number of bolts may be employed in this manner, but in the smaller size valves (2 inch and under) I prefer to use two such bolts passing through projections which are adjacent the ends of the weir.

In the diaphragm valves heretofore proposed even the smaller sizes have employed at least four such bolts or their equivalents. However, with the saddle-like shape of the edge of my improved diaphragm and the corresponding shape of the clamping body and bonnet flanges, I have found that location of the bolts in the usual manner is unsatisfactory in these smaller sizes. More particularly I found that when the body and bonnet projections, through which the bolts pass, are located adjacent a sloping portion of the flange around the body opening, the tightening of the bolts associated with each pair of such projections must be done very carefully or the lower curved end of the bonnet will be poorly aligned with respect to the body and leakage will result. Consequently I have included in my improved diaphragm valve two structural features which enable me to use only two bolts in the smaller sizes and in the larger size fewer bolts than were usually thought necessary to give the proper clamping force. To enumerate these two structural features, first of all, the flange 10f surrounding the body opening 10e has a clamping surface which is inclined downward toward the weir at all points save at the sides of the body. Moving along this flange 10f to the lower portions thereof adjacent the ends of the weir, this inclined surface gradually merges into two horizontal surfaces. The lower flange end 14a of the bonnet 14 has its clamping surface correspondingly inclined, and the inclined portions of these surfaces clamp the diaphragm edge between them with a greater force, for a given tightening of the bolts, then it is clamped by the horizontal portions of these surfaces which are perpendicular to the bolts. This is because these inclined clamping surfaces grip the diaphragm edge with a wedging action, and this wedging action is most effective at the higher points on the flange 10f where the inclination is greatest. It will be noted that these points are farthest from the bolts. The extra squeeze this wedging action provided on the diaphragm edge helps to make additional bolts at these points unnecessary. Secondly, two bolts are sufficient to hold the diaphragm in the smaller sizes of my improved valve because the periphery of the diaphragm which lies just outside the bonnet flange 14a and body flange 10f is enlarged to form the bead 12b. Large pressures in the passageway of a diaphragm valve tend to pull the clamped diaphragm edge inward, and consequently one function of the bolts corresponding to my bolts 16 has been to prevent this inward movement. Two bolts alone would not do this effectively in the valves heretofore proposed. However, by providing the bead 12b on the diaphragm periphery the bolts 16 in my improved valve need only provide enough clamping force to prevent leakage between the body flange 10f and the diaphragm edge 12a. This they do adequately, and the inward movement due to line pressure is prevented by the bead. Furthermore the greater the force pulling the diaphragm inward the tighter the sealing action because this force draws the bead against the outer edge of the body flange.

I claim:

1. A diaphragm valve having a body with a substantially straight passageway therethrough and an opening at one side portion thereof, a weir extending across the passageway at the side of the body opposite the opening and having a surface forming a diaphragm seat the ends of which merge with the rim of the opening at points which define a line spaced inwardly from a second line passing through points on the rim of the opening, which second line together with the longitudinal axis of the passageway forms a plan perpendicular to said first line, a bonnet having one end complementary to the rim of the body opening and secured to the body, a diaphragm having its edge clamped between the rim and said bonnet end, means carried within said bonnet and associated with said diaphragm for moving the latter into and out of seating engagement with said weir.

2. A diaphragm valve having a body with a substantially straight passageway therethrough and an opening at one side portion thereof, a weir extending across the passageway at the side of the body opposite the opening and having a surface forming a diaphragm seat, the ends of which merge with the rim of the opening at points which define a line which perpendicularly intersects a plane defined by the longitudinal axis of the body and a second line passing through points on the rim of the opening, said intersection occurring in the plane at a point inwardly of the latter line, a bonnet having one end complementary to the rim of the body opening and secured to the body, a diaphragm having its edge clamped between the rim and said bonnet end, means carried within said bonnet and associated with said diaphragm for moving the latter into and out of seating engagement with said weir.

3. A diaphragm valve having a body with a substantially straight passageway therethrough and an opening at one side portion thereof, a weir extending across the passageway at the side of the body opposite the opening and having a surface forming a diaphragm seat the ends of which merge with the rim of the opening and lie in a plane parallel to the longitudinal axis of the body, said plane being spaced inwardly from a second plane which is parallel thereto and includes longitudinally spaced points on the rim of the opening and which is substantially tangential to the body, a bonnet having one end complementary to the rim of the body opening and secured to the body, a diaphragm having its edge clamped between the rim and said bonnet end, means carried within said bonnet and associated with said diaphragm for moving the latter into and out of seating engagement with said weir.

4. A diaphragm valve having a body with a substantially straight passageway therethrough, a shallow weir which extends across said passageway and has a concave surface forming a diaphragm seat, the body having opposite the weir an opening with a flange therearound, the ends of the weir merging with the flange and lying in a plane parallel to the longitudinal axis of the body, said plane being spaced inwardly from a second plane which is parallel thereto and includes longitudinally spaced points on the flange of the opening and which is substantially tangential to the body, a bonnet having one end complementary to the flange of the body opening and secured to the body, a diaphragm having its edge clamped between the flange and said bonnet end, means carried within said bonnet and associated with said diaphragm for moving the latter into and out of seating engagement with said weir.

5. A diaphragm valve having a cylindrical body with a substantially straight passageway therethrough intersected by a shallow transverse weir which extends inwardly part of the diameter of the passageway and has a concave surface forming a diaphragm seat, a cylindrical bonnet secured to said body opposite to said weir, the body also having opposite the weir an opening the rim of which follows the line of intersection of the body and the cylindrical bonnet, the axis of said bonnet being at right angles to and substantially passing through the longitudinal axis of said body, said rim at the sides of said body merging into the weir ends, said bonnet being secured to said body and having an end adjacent thereto which likewise follows said line of intersection so that the curvature of said bonnet end corresponds to the curvature of said rim, a diaphragm having its edge clamped between said rim and said bonnet end and having said edge curved to correspond to said line of intersection, a compressor within said bonnet and attached to the diaphragm on the side thereof opposite said weir, and means connected to said compressor for actuating said compressor to move said diaphragm toward or from said weir.

6. A diaphragm valve having a body with a substantially straight passageway therethrough, a weir which extends across the passageway and has a surface forming a diaphragm seat, the body having opposite the weir an oval opening the longest dimension of which is parallel to the longitudinal axis of the body, an oval bonnet having one end secured to said body so as to cover said opening, an oval diaphragm having its edge clamped between said end of the bonnet and the rim of said opening, means carried within said bonnet and associated with said diaphragm for moving the latter into and out of seating engagement with said weir.

7. A diaphragm valve having a body with a substantially straight passage therethrough intersected by a transverse weir which extends inwardly part of the diameter of the passageway and has a concave surface forming a diaphragm seat, the body having opposite the weir an oval opening with a flange therearound, the longest dimension of which oval is parallel to the longitudinal axis of said body, an oval bonnet secured to said body so as to cover said opening and having a flanged end adjacent the body flange, an oval diaphragm having its edge clamped between said body and bonnet flanges, a compressor within said bonnet and attached to the diaphragm on the side thereof opposite said weir, and means connected to said compressor for actuating said compressor to move said diaphragm toward or from said weir.

8. A diaphragm valve having a body with a substantially straight passageway therethrough and an opening at one side portion thereof, a weir extending across the passageway at the side portion of the body opposite the opening and having a surface forming a diaphragm seat the ends of which merge with the rim of the opening at points which define a line spaced inwardly from a second line passing through points on the rim of the opening, which second line together with the longitudinal axis of the passageway forms a plane perpendicular to said first line, a bonnet having one end complementary to the rim of the body opening and secured to the body, a diaphragm having its edge clamped between the rim and said bonnet end, said clamped diaphragm edge, said bonnet end and the rim of said opening each having the same oval configuration when viewed along the axis of the bonnet which is perpendicular to the longitudinal axis of the body with which latter axis the longest dimension of the oval configuration is parallel, means carried within said bonnet and associated with said diaphragm for moving the latter into and out of seating engagement with said weir.

9. A diaphragm valve having a body with a substantially straight passageway therethrough and an opening at one side portion thereof, a shallow weir which extends across said passageway at the side portion of the body opposite the opening and has a concave surface forming a diaphragm seat, the body having a flange around the opening, the ends of the seat merging with the flange at points defining a line which perpendicularly intersects a plane formed by the longitudinal axis of the body and a second line passing through points on the flange, said intersection occurring in the said plane at a point inwardly of the latter line, a bonnet having one end provided with a flange complementary to the flange on the body opening and secured thereto, a diaphragm having its edge clamped between said flanges, said clamped diaphragm edge and said flanges each having the same oval configuration when viewed along the axis of the bonnet which is perpendicular to the longitudinal axis of the body with which latter axis the longest dimension of the oval configuration is parallel, a compressor within said bonnet and attached to the diaphragm on the side thereof opposite said weir, and means connected to said compressor for actuating said compressor to move said diaphragm toward or from said weir.

10. A diaphragm valve having a cylindrical body with a substantially straight passageway therethrough intersected by a shallow transverse weir which extends inwardly part of the diameter of the passageway and has a concave surface forming a diaphragm seat, an oval bonnet secured to said body, the body having opposite the weir an opening the rim of which follows the line of intersection of the body and the oval bonnet, said bonnet having an axis at right angles to and substantially passing through the longitudinal axis of said body and having its longest oval dimension parallel to the longitudinal axis of said body, said rim at the sides of said body merging into the weir ends, said bonnet having an end adjacent to said body which likewise follows said line of intersection so that the curvature of said bonnet end corresponds to the curvature of said rim, an oval diaphragm disposed across said body opening, said diaphragm having its edge clamped between said rim and said bonnet end and likewise having said clamped edge curved to follow said line of intersection, an oval compressor within said bonnet and attached to the diaphragm on the side thereof opposite said weir, and means connected to said compressor for actuating said compressor to move said diaphragm toward or from said weir.

References Cited in the file of this patent

UNITED STATES PATENTS

| | | |
|---|---|---|
| 1,992,043 | Saunders | Feb. 19, 1935 |
| 2,616,164 | Tiedemann | Nov. 4, 1952 |
| 2,661,767 | Lamb | Dec. 8, 1953 |
| 2,667,184 | Hailer | Jan. 26, 1954 |

FOREIGN PATENTS

| | | |
|---|---|---|
| 429,244 | France | July 11, 1911 |